No. 779,527.

Patented January 10, 1905.

UNITED STATES PATENT OFFICE.

HERBERT H. CHURCH, OF BELLOWS FALLS, VERMONT, ASSIGNOR TO CASEIN COMPANY OF AMERICA, A CORPORATION OF NEW JERSEY.

WAX EMULSION AND PROCESS OF PRODUCING SAME.

SPECIFICATION forming part of Letters Patent No. 779,527, dated January 10, 1905.

Application filed April 5, 1904. Serial No. 201,755.

*To all whom it may concern:*

Be it known that I, HERBERT H. CHURCH, a citizen of the United States, residing at Bellows Falls, in the county of Windham and State of Vermont, have invented or discovered certain new and useful Improvements in Wax Emulsions and Processes of Producing Same, of which the following is a specification.

This invention or discovery has for its object to provide a wax emulsion suitable for use in the arts, such as in the paper-manufacturing and textile trades or for laundry use, which will contain a large proportion of paraffin-wax in an emulsified condition, and which emulsion, while smooth and soft, may be produced at comparatively little cost.

This paraffin-wax emulsion is preferably produced in the following manner: To fifty parts, by weight, of paraffin-wax and fifty parts, by weight, of stearic acid are added about three hundred parts, by weight, of water. These ingredients are then thoroughly heated until the solid substances are completely melted. To the hot liquid is then preferably added about twenty parts, by weight, of borax previously dissolved in a small quantity of water, or instead of the borax, which has an alkaline reaction, a smaller quantity—say about ten parts—of an alkali, such as caustic soda, previously dissolved in water, may be used. The mixture should then be kept heated to the boiling-point with continual agitation. This heating and agitation should be kept up for at least half an hour after the addition of the borax and alkali. When the borax or alkali has first been added, the mixture will froth or foam considerably, and it is important to continue the boiling and agitation until such frothing or foaming has ceased and which will require at least half an hour. When the frothing or foaming has ceased and the product is cooled, the result will be a perfectly smooth and white wax emulsion.

The invention or discovery is not to be understood as being limited to the exact proportions of the ingredients stated or to the use of any particular alkali, as other alkalies or alkaline substances than those referred to may be employed with good results.

Having thus described my invention or discovery, I claim and desire to secure by Letters Patent—

1. The herein-described wax emulsion consisting of about fifty parts of paraffin-wax, fifty parts of stearic acid, twenty parts of borax, and water.

2. The herein-described process of producing a wax emulsion, consisting in melting paraffin-wax and stearic acid in water, with the aid of heat; then adding an alkaline solution to the mixture; then boiling the said mixture for half an hour or more, with continual agitation, until foaming or frothing thereof has ceased.

3. The herein-described process of producing a wax emulsion consisting in melting paraffin-wax and stearic acid in water, with the aid of heat; then adding borax to the mixture, and subsequently boiling the said mixture for half an hour or more, with continual agitation, until foaming or frothing thereof has ceased.

In testimony whereof I affix my signature in presence of two witnesses.

HERBERT H. CHURCH.

Witnesses:
 LOUIS H. SMITH,
 A. F. GRIGNON.